Reissued Oct. 18, 1927.

Re. 16,772

UNITED STATES PATENT OFFICE.

HEINRICH WIELAND, OF MUNICH, GERMANY, ASSIGNOR TO THE FIRM OF C. H. BOEHRINGER SOHN CHEMISCHE FABRIK, OF NEIDER-INGELHEIM-ON-THE-RHINE, GERMANY.

PROCESS FOR OBTAINING THE ACTIVE PRINCIPLE OF LOBELIA.

No Drawing. Original No. 1,505,181, dated August 19, 1924, Serial No. 395,131, filed July 9, 1920, and in Germany April 4, 1914. Granted under the provisions of the Act of March 3, 1921, 41 Stat. L., 1313. Renewed November 21, 1922. Application for reissue filed April 22, 1926. Serial No. 103,977.

Up to date very little was known about the alkaloids of *Lobelia inflata* and the investigators of the same agree that said alkaloids as well as their salts are not very stable. Previous attempts to obtain the active therapeutic principle of the drug in pure form were apparently not well directed for until now the opinion prevailed that the initial material was unusually sensitive and that efforts to isolate it could therefore not be expected to meet with success.

Yet it is possible to obtain the desired compound in pure and stable form in a relatively simple manner. The effective alkaloid freed from its companion products is a well characterized compound which crystallizes well and is quite stable. The salts also possess good crystallizing properties and are chiefly neither hygroscopic nor unstable.

C. Siebert, see "Beitrag zur Kenntnis des Lobelins und Lupanins" (Inaugural-Dissertation, Marburg, 1891) described on page 10 a supposed uniform lobeline as a melligenous liquid which is said to give a hydrochloride crystallizing from water. The bases described by Siebert are however deficient in all signs of uniformity. The hydrochloride mentioned above also is not, as Siebert seemed to assume, the salt of the effective base since it corresponds to the formula $C_{18}H_{23}NO_2HCL+H_2O$ while the base separated according to the new process gives analysis figures which correspond best with the formula $C_{22}H_{27}O_2N$. Seibert probably had in hand the hydrochloride of *6*-lobeline which is rather difficult to dissolve in water and especially in hydrochloric acid.

According to the experiments carried out by applicant at least three alkaloids are present in the raw lobeline:

(1) α-lobeline, colourless crystals of 130° C. melting point. It has the known effect of *Lobelia inflata*. It probably has the formula $C_{22}H_{27}O_2N$.

(2) *6*-lobeline, which is not crystalline. It is characterized by a hydrochloride which is rather difficult to dissolve in water.

(3) γ-lobeline, which is not crystalline. Its salts also are not crystalline.

The α-lobeline furthermore furnishes an amorphous yellow white platinic chloride double-salt which contains 17.6% of platinum.

α-lobeline and *6*-lobeline give difficultly soluble mercurous double-salts which if desired may serve to purify the base mixture.

According to the new process a mixture of the raw lobeline alkaloids obtained by the usual methods of recovering alkaloids is dissolved in hydrochloric acid and after removing the crystals of the hydrochloride of the *6*-lobeline the hydrochloride of the effective α-lobeline is separated by shaking out with chloroform or some other suitable solvent.

The drug may be extracted with alcohol; after distilling off the alcohol, the basic portions may be extracted from the residue by means of diluted acids and the alkaloids recovered from the acid solutions by treatment with alkali and extraction with ether, or other solvent as for instance benzene. From these extracts the bases are obtained in ethereal solution by shaking with acids and again treating with alkali.

In each case an ether solution is obtained which leaves behind the alkaloids as a melligenous liquid which furnishes the initial substance for the process. The bases are dissolved in dilute hydrochloric acid and after some standing the *6*-lobeline hydrochloride crystallizes out. As soon as it is obvious that the deposit does not increase it is filtered off. The filtrate is repeatedly shaken with chloroform which takes up the α-lobeline as hydrochloride and in consequence of partial hydrolysis also a small part of the base. The chloroform is then shaken with a soda solution and thereupon the chloroform is carefully evaporated. The residue crystallizes after short standing; the crystals are then washed with ether and if necessary the base is re-crystallized from ether.

Beautiful colourless crystals having a melting point of 130° C. and which are easily soluble in most of the organic solvents are obtained.

α-lobeline is very difficultly soluble in water.

The hydrochloride dissolves readily in water whereas the hydrobromide is more difficultly soluble. Both salts show a neutral reaction. The chloroplatinate, which is nearly insoluble in water, is deposited as a fine crystalline powder. The mercurous double-salt is just as difficultly soluble.

The α-lobeline is used internally as well as in form of injections for asthma and similar diseases.

Example: For the exhaustive extraction of the drug the application of 15 times the quantity of extraction agent (as for instance alcohol ether) is as a rule sufficient. The drug is made alkaline preferably by adding from one half to an equal weight of a 3–10% soda solution. The time required for the extraction depends, as in all such cases, on the flowing velocity of the extraction agent. 7 kg. of drugs may be exhausted in 7–10 hours. Heating is not necessary. The average content of the drug is about ½% of raw alkaloids made up of between 30 and 50% of α-lobeline and 20–40% of β-lobeline. The raw alkaloid is dissolved in 25 times its quantity of dilute hydrochloric acid and is shaken 6–8 times with one tenth of its volume of chloroform after the crystals of hydrochloride of the β-lobeline have been separated. The chloroform extract is shaken with a solution of an alkaline agent, and the base is recovered from its chloroform solution by evaporation.

It has further been found that the effective α-lobeline may be obtained from the mixture with β-lobeline dissolved in hydrochloric acid not only by shaking out with chloroform but also with other solvents such as for example carbon tetrachloride, trichlorethylene or acetylene tetrachloride.

If the solvents referred to are used instead of chloroform one obtains the advantage of lowering the cost by avoiding the losses of solvents.

Example: The raw alkaloids of lobelia obtained from the drug in the manner described above are dissolved in 25 times their quantity of dilute hydrochloric acid and are shaken 6–8 times with one tenth their volume of trichlorethylene after any precipitates of hydrochlorides have been separated. The trichlorethylene extract is then shaken with a soda solution, freed of the soda solution and evaporated until dry. The residue crystallizes after short standing.

I claim:

1. A process for obtaining the effective principle of lobelia, which comprises dissolving a mixture of raw lobelia bases, obtained by the usual methods of recovering alkaloids, in hydrochloric acid, separating from the solution thus obtained the difficultly soluble hydrochloride of the β-lobeline by crystallization and extracting the easily soluble hydrochloride of the effective α-lobeline from the filtrate by shaking it with a solvent.

2. A process for obtaining the effective ingredient of lobelia, which comprises dissolving a mixture of raw lobelia bases, obtained by the usual methods of recovering alkaloids, in hydrochloric acid, separating the difficultly soluble hydrochloride of the β-lobeline from the solution by crystallization, and extracting the easily soluble hydrochloride of the effective α-lobeline from the filtrate by shaking it with chloroform.

3. As a new article of manufacture an alkaloid having the medicinal properties of *Lobelia inflata*, said alkaloid having probably the formula $C_{22}H_{27}O_2N$, forming colorless crystals melting at 130° C., furnishing an amorphous yellowish-white platinum chloride double salt containing 17.6% pt., furnishing a difficultly soluble mercurous double salt, and being very difficultly soluble in water, and its hydrochloride being easily soluble in water and chloroform, substantially as hereinbefore described.

4. As a new article of manufacture, an alkaloid compound comprising probably the alkaloid grouping $C_{22}H_{27}O_2N$, said alkaloid compound in the form of its free base forming colorless crystals melting at 130° C., furnishing an amorphous yellowish-white platinum chloride double salt containing 17.6% pt., forming a difficultly soluble mercurous double salt, and being very difficultly soluble in water, and in the form of its hydrochloride being easily soluble in water and chloroform.

5. A process for obtaining the effective principle of lobelia, which consists in dissolving a mixture of raw lobelia bases, obtained by the usual methods of recovering alkaloids, in hydrochloric acid, separating from the solution thus obtained the difficultly soluble hydrochloride of the β-lobeline by crystallization, extracting the easily soluble hydrochloride of the effective α-lobeline from the filtrate by shaking it with a solvent, treating the solvent extract with a solution of an alkaline agent, separating the solvent layer and evaporating the solvent.

6. A process for obtaining the effective ingredient of lobelia, which consists in dissolving a mixture of raw lobelia bases, obtained by the usual methods of recovering alkaloids, in hydrochloric acid, separating the difficultly soluble hydrochloride of the β-lobeline from the solution by crystallization, extracting the easily soluble hydrochloride of the effective α-lobeline from the filtrate by shaking it with chloroform, treating the chloroform extract with a soda solution, separating the soda solution from the chloroform, and evaporating the chloroform.

In witness whereof I have subscribed my name to this specification.

HEINRICH WIELAND.